| United States Patent [19] | [11] Patent Number: 5,068,097 |
| Eckert et al. | [45] Date of Patent: Nov. 26, 1991 |

[54] HIGHLY PURE TANTALUM PENTOXIDE AND A PROCESS FOR ITS PREPARATION

[75] Inventors: Joachim Eckert, Bad Harzburg; Walter Bludssus, Vienenburg, both of Fed. Rep. of Germany

[73] Assignee: Herman C. Starck Berlin GmbH & Co. KG, Berlin, Fed. Rep. of Germany

[21] Appl. No.: 473,731

[22] Filed: Feb. 2, 1990

[30] Foreign Application Priority Data

Feb. 14, 1989 [DE] Fed. Rep. of Germany ....... 3904292

[51] Int. Cl.$^5$ .............................................. C01G 35/00
[52] U.S. Cl. ................................................... 423/592
[58] Field of Search ...................... 423/67, 592; 264/5; 420/427

[56] References Cited

U.S. PATENT DOCUMENTS

| 3,909,241 | 4/1987 | Cheney et al. | 75/255 |
| 4,661,423 | 4/1987 | Ueno et al. | 429/46 |
| 4,673,554 | 6/1987 | Niwa et al. | 423/63 |
| 4,741,894 | 5/1988 | Melas | 423/592 |
| 4,861,747 | 8/1989 | Wachs et al. | 502/325 |

FOREIGN PATENT DOCUMENTS 0070642  1/1983  European Pat. Off. ............ 423/592

OTHER PUBLICATIONS

Metals Handbook Ninth Edition, vol. 7, Powder Metallurgy, pp. 278–281, 1984.

*Primary Examiner*—Michael Lewis
*Assistant Examiner*—Steven Bos
*Attorney, Agent, or Firm*—Connolly and Hutz

[57] ABSTRACT

A highly pure tantalum pentoxide powder and a process for its preparation are disclosed. The powder is substantially free of impurities and is further characterized by improved flow characteristics.

7 Claims, No Drawings

HIGHLY PURE TANTALUM PENTOXIDE AND A PROCESS FOR ITS PREPARATION

FIELD OF THE INVENTION

The present invention relates to a highly pure tantalum pentoxide and a process for its preparation.

BACKGROUND OF THE INVENTION

Tantalum pentoxide ($Ta_2O_5$) is an important basic material for the production of electronic components (dielectrics, piezoelectrics and, optoelectronic components). The purity requirements of tantalum pentoxide are particularly high in this field of use. Degrees of purity of more than 99.9% are an entirely usual order of magnitude.

Tantalum pentoxide qualities with a purity of more than 99.99% $Ta_2O_5$ can be obtained on the basis of the known preparation processes, such as described e.g. in EP-A 70 642 or U.S. Pat. No. 44 90 340. Because of their coarse-grained nature, however, powder metallurgy or ceramic processing cannot be ensured without problems. On the other hand, in the finely ground state their flow properties are so deficient that inhomogeneities arise within the components during powder metallurgy processing. When tantalum pentoxide powders are used as a constituent of mixtures of different types of metal oxide in particular, the properties described for the tantalum pentoxide powders belonging to the prior art result in great diasadvantages.

Determination and measurement of flowability of metallic powders can be achieved by the procedure set forth in ISO (International Organization for Standardization) standard no. 4490 published in 1978. The International Organization for Standardization is a worldwide federation of national standards institutes. A draft of ISO standard 4490 was circulated to ISO member bodies in June 1977 and at the time of publication of the standard in 1978, it had been approved by twenty-two member countries, including the United States.

In following ISO 4490, flowability is determined by measurement of the time in seconds required for 50 grams of metallic powder to flow through the orifice of a calibrated funnel (Hall flowmeter) of standardized dimensions.

The object of this invention is thus to provide a tantalum pentoxide powder which does not have the disadvantages described.

SUMMARY OF THE INVENTION

It has now been found that these requirements are met in an outstanding manner by a tantalum pentoxide powder of a purity of more than 99.99%, which has a flowability of less than 50 seconds (according to ISO standard 4490/1978) at a flowmeter orifice of 5.08 mm. This invention relates to such a tantalum pentoxide powder. In a preferred embodiment, the average size of the tantalum pentoxide pwder according to the invention is less than 0.5 $\mu$m (measured with a scanning electron microscope,"SEM"). In a particularly preferred embodiment, the tantalum pentoxide powder according to the invention meets the highest purity requirements. Thus, the total content of impurities of the elements aluminium, calcium, chromium, cobalt, copper, iron, nickel, niobium, silicon, titanium, tungsten, zirconium, fluorine and sulphur is less than 50 ppm, and even total contents of the impurities of less than 30 ppm are possible.

DETAILED DESCRIPTION OF THE INVENTION

The tantalum pentoxide powder according to the invention is moreover characterized by its very low fluorine content. Thus, it preferably has fluorine contents of not more than 20 ppm, preferably 10 ppm, and particularly preferably 5 ppm.

Another characteristic of the tantalum pentoxide powder according to the invention is its specific BET surface area(measured in accordance with DIN 66 131, nitrogen 1 point method) of more than 4 $m^2/g$.

This invention also relates to a process for the preparation of the tantalum pentoxide powder according to the invention. This essentially consists of known part steps, the precipitation of tantalum hydroxide taking place with aqueous ammonia, as is generally customary. In contrast to the general prior art, however, the washed-out hydroxides are not calcined at temperatures of 900° C. or more (EP-A 70 642), but preferably between 700° and 800° C. This invention thus relates to a process for the preparation of the tantalum pentoxide powder according to the invention, by which tantalum hydroxide precipitated by ammonia is calcined at temperatures between 700° and 800° C. A residence time of the product in the calcining furnace of at least 3.5 hours should be ensured here.

The fine grinding of the caked tantalum pentoxide particles should furthermore be carried out in a bead mill which is lined with inert material, preferably sheet tantalum, and is operated with sintered tantalum pellets (tantalum tablets), that is to say cylindrically shaped tantalum metal bodies. In a preferred embodiment of the process according to the invention, the cylindrical tantalum metal bodies have a diameter of 5 to 50 mm and a length of 5 to 50 mm.

The ground material discharged already corresponds to the tantalum pentoxide powder according to the invention. Fine sieving can follow if required.

The invention is illustrated by way of example below, without this being regarded as a limitation of the invention.

EXAMPLE 5 kg tantalum hydroxide which had been precipitated from an acid heptafluorotantalate solution by ammonia precipitation and washed salt-free was calcined in a calcining furnace at 750° C. for 10 hours. Analysis of an average sample gave the sum of all the metallic and non-metallic impurities as <50 ppm, the fluorine content being below 2 ppm.

The average particle size according to SEM was about 2 $\mu$m. The calcined product was now introduced into a laboratory bead mill together with grinding bodies of tantalum metal pellets, the grinding container of gross volume of 4 liters being lined on the inside with sheet tantalum. The calcined material was ground on a roller bench for 20 min. The charging of the bead mill had been set at 4 kg grinding bodies and 1 kg tantalum pentoxide.

Analysis of the ground material showed a decrease in the average particle size to 0.4 $\mu$m (according to SEM), a specific surface area of 6.2 $m^2$ per gram and a fluorine content of <2 ppm. Measurement of the flowability with a "Hall flowmeter" in accordance with ISO 4490 gave a Hall flow index of 105 seconds for the 50 g sample at a flowmeter orifice of 2.5 mm, and a value of 20 seconds for the 5 mm opening.

Examination of the tantalum pentoxide powder thus obtained under a scanning electron microscope showed an excellent uniformity and isometry of the powder particles.

The analytical results of the tantalum pentoxide powder after calcining and grinding are summarized in the table. A tantalum pentoxide powder of the type "HPO-$Ta_2O_5$" from HCST (HPO) has been compared as a comparison sample.

Table

| Element | Calcined material | Ground material | HCST-HPO |
| --- | --- | --- | --- |
| Aluminium | <1 ppm | <1 ppm | 2 ppm |
| Calcium | <1 ppm | <1 ppm | 10 ppm |
| Chromium | <1 ppm | <1 ppm | 2 ppm |
| Cobalt | <1 ppm | <1 ppm | 2 ppm |
| Copper | <1 ppm | <1 ppm | 2 ppm |
| Iron | <1 ppm | <1 ppm | 7 ppm |
| Nickel | <1 ppm | <1 ppm | 2 ppm |
| Niobium | <5 ppm | <5 ppm | 130 ppm |
| Silicon | <3 ppm | <3 ppm | 43 ppm |
| Titanium | <1 ppm | <1 ppm | 3 ppm |
| Tungsten | <1 ppm | <1 ppm | 3 ppm |
| Zirconium | <1 ppm | <1 ppm | 2 ppm |
| Fluorine | 2 ppm | 2 ppm | 141 ppm |
| Sulphur | <10 ppm | 10 ppm | 32 ppm |
| Physical properties: | | | |
| Particle size (SEM) | 2.0 μm | 0.3 μm | 5 μm |
| Sec. surface area (according to BET/DIN 66 131, $N_2$ 1 point method) | 2.1 m²/g | 6.2 m²/g | 2.5 m²/g |
| Hall flow index: (2.5/5.0 mm) | not free flowing | 20/105 (sec) | not free flowing |

What is claimed is:

1. Tantalum pentoxide consisting essentially of particles with an average particle size less than 0.5 μm with a purity greater than 99.99% and having a flowability of less than 50 seconds with a flowmeter orifice of 5.08 mm.

2. Tantalum pentoxide powder according to claim 1, characterized in that the total content of impurities comprising the elements of Al, Ca, Cr, Co, Cu, Fe, Ni, Nb, Si, Ti, W, Zr, F and S is in total less than 50 ppm.

3. Tantalum pentoxide powder according to claim 2, characterized in that the total content of the impurities is less than 30 ppm.

4. Tantalum pentoxide powder according to claim 1, further characterized in that the content of fluorine is not in excess of 20 ppm.

5. Tantalum pentoxide powder according to claim 4, characterized in that the fluorine content is not more than 10 ppm.

6. Tantalum pentoxide powder according to claim 5, characterized in that the fluorine content is not in excess of 5 ppm.

7. Tantalum pentoxide powder according to claim 1, further characterized as having a specific surface area of more than 4 m²/g.

* * * * *